United States Patent [19]
Friedl

[11] 3,826,992
[45] July 30, 1974

[54] DEVICE FOR AMPLIFICATION OF A COHERENT OPTICAL SIGNAL

[75] Inventor: Wolfgang Friedl, Neckargemund, Germany

[73] Assignee: Eltro GmbH & Co., Heidelberg, Germany

[22] Filed: Mar. 23, 1973

[21] Appl. No.: 344,282

[30] Foreign Application Priority Data
Apr. 7, 1972  Germany............................ 2216747

[52] U.S. Cl............. 330/4.3, 331/94.5 R, 350/96 B
[51] Int. Cl................................................. H01s 3/02
[58] Field of Search.......... 330/4.3; 350/96 B, 96 R; 331/94.5

[56] References Cited
UNITED STATES PATENTS
3,484,710  12/1969  Korster................................ 330/4.3
3,599,106  8/1971  Snitzer................................. 330/4.3

Primary Examiner—Maynard R. Wilbur
Assistant Examiner—N. Moskowitz
Attorney, Agent, or Firm—Eric H. Waters

[57] ABSTRACT

A device for the amplification of a coherent optical signal including a light amplifying conductive filament having an optically passive core encompassed by a sleeve including a selective fluorescent optically active material, which is in turn encompassed by an optically passive outer sleeve; a second light-conductive propagating filament being positioned in axial alignment therewith and formed of a core and encompassing sleeve of optically passive materials; and a spectroscopic divider being interposed between said amplifying and propagating light-conductive filaments.

3 Claims, 2 Drawing Figures

DEVICE FOR AMPLIFICATION OF A COHERENT OPTICAL SIGNAL

FIELD OF THE INVENTION

The present invention relates to a device for the intensification of a coherent optical signal with a selective fluorescent medium, comprising one or more light-conductive filaments each consisting of a core and an encompassing sleeve, wherein the major portion of the refractive index of the sleeve, in particular for the propagating wave length, is smaller than that of the core.

DISCUSSION OF THE PRIOR ART

At present, there are known optical signal intensifiers or amplifiers which utilize the principle of the inversion of discrete energy levels of an optical material and of stimulated emission, and in which the stimulatable material forms the core of a light-conductive filament which is encompassed by a sleeve constituted of an optically passive material. Additionally, a plurality of filaments may be assembled into a bundle so as to form an optical signal intensifier or amplifier. Such types of so-called laser-intensifiers are described in, for example, German laid-open Specification No. 1,589,740, published Specification No. 1,158,172, as well as in U.S. Pat. No. 3,395,366. Although the optical propagation in these known installations is obtained by means of a light propagating source which encompasses the light conductive filament either in the form of a cylindrical sleeve or as a helix-wound cover, or possibly, in a rod-shaped configuration, may extend along the longitudinal axis of a filament bundle. In all instances, the light propagating source and light-conductive fibers are in a mutual concentrically positioned relationship. A theoretical treatise pertaining to the energy conveyance of optical wave conductors or light-conductive filaments which are subject to dielectric losses, may be referred to in the journal "Experimentelle Technik der Physik", XVIII, 1970, Volume 6, pages 439 through 444.

These prior art intensifying or amplifying devices are subject to various servious drawbacks, inasmuch as the optical propagating methods employed therein are difficult to manipulate or manage and the obtained efficiencies or too low. Consequently, these prior art devices have, as of this time, not been applicable to the present technology and practice.

SUMMARY OF THE INVENTION

Accordingly, it is an object of the present invention to provide a device for the intensification or amplification of coherent optical signals pursuant to the above-described art, in which a higher degree of optical efficiency is obtained, and in which the device is much more compact as compared with presently utilized optical amplifiers.

The foregoing problem is inventively solved in that a selective fluorescent or optically active material is provided in a first sleeve or cover which encompasses an optically passive core and with the sleeve, in turn, being encompassed by a second optically passive sleeve or cover, whose refractive index is lower than the major portion of the refractive index of the first sleeve. Furthermore, in order to provide for the optical propagation effect of the device, the latter includes an encompassing light-conductive filament formed of an optically passive material in coaxial relationship or alignment with an amplifying-light conductive filament, in which the refractive indices of both its core and sleeve elements correspond to the major or actual portion of the refractive index of the core and first sleeve of the amplifying-light conductive filament. In addition, the device is also provided with a spectroscopic divider, which is adapted to effect the coupling or connecting of the propagated signals as well as of the signals to be intensified in the amplifying-light conductive filament, and which is positioned intermediate the latter and the light-propagating filament.

In accordance with the invention an entirely new method is employed with respect to the optical propagation of a stimulable light-conductive filament, and which is rendered possible through the development of specialized glass filaments or fibers. Thus, the optically active inner sleeve may, for example, be formed of a neodymium-punctuated or spotted glass, whereas the passive core and the outer second sleeve may be formed of glass. The light propagation source may, for example, be constituted of a GaAlAs-laser.

When the propagated light or optical signal is conveyed into the passive core of the amplifying-light conductive filament, the encompassing active material sleeve may be optically propagated in accordance with the principle of restrained total reflection, in effect, the introduced optical wave extends across into the sleeve so as to be absorbed therein. The signal to be amplified is, with the assistance of a suitable spectroscopic divider positioned intermediate the amplifying and the light propagating conductive filaments, conveyed into the passive core of the first-mentioned filament, and from there extends into the active material sleeve, or alternatively is directly introduced into the latter. The stimulated emission generated therein is then further conducted within the sleeve, upon selectively providing requirements therefore, so as to form a condition of total reflection at the contacting surfaces between the inner active material sleeve and the outer passive material sleeve. The foregoing provides for that at the contacting surface there is neither an absorption of the propagated optical signals nor of the amplified signals, whereby the outer sleeve merely effects the optical isolation with respect to the environment or surroundings.

The losses encountered through the energy conduction in an optical wave conductor or in a light-conductive filament render possible the optical propagation of the active medium, in view of which the length of the filament and the cross-section of the wave-conductive core must be correlated so that the introduced propagation energy is precisely utilized. Furthermore, prior consideration must also be given in that the depth of introduction of the energy into the active medium is sufficiently large with regard to the wave length, and that the damping constants of the wave conductor are inherently small in comparison with the active medium or material in the first sleeve. Finally, it follows therefrom, that the damping is the resultant only of the wave extending across the contacting surface between the core and the sleeve.

A particular advantage of the inventive optical intensifying or amplifying device lies in that the foregoing may be actuated without intermediaries by means of quasi-monochromatic propagating sources, for example, laser-oscillators, which are also quasi-point shaped, so as to prevent, to the greatest possible extent, the unnecessary heating of the device. The spatially separated locations of the light propagating source and of the amplifying-light conductive filament is also to be considered as a further advantage, which facilities the application of the present invention to numerous and varied uses.

Advantageously, the distal end portion of the amplifying-light conductive filament spaced from the propagating-light conductive filament is sloped or angled to an extent so as to form an acute angle with an imaginary line extending normal to the longitudinal axis of the light-conductive filament. This, of course, will prevent that a portion of the wave conducted further along the active material sleeve is reflected back within the sleeve so as to cause oscillations. The amplified signal is also emanated and received from this sloped end surface.

When a plurality of the light-conductive filaments, as described with respect to the foregoing, and their related propagating optical wave sources are assembled so as to form a filament bundle, which may have a flat configuration, the inventive device may be utilized for the amplification of one-dimensional pictures.

BRIEF DESCRIPTION OF THE DRAWING

Reference may now be had to the accompanying drawings schematically illustrating preferred embodiments of an optical signal amplifying device in accordance with the invention; in which.

DETAILED DESCRIPTION

Figure 1:
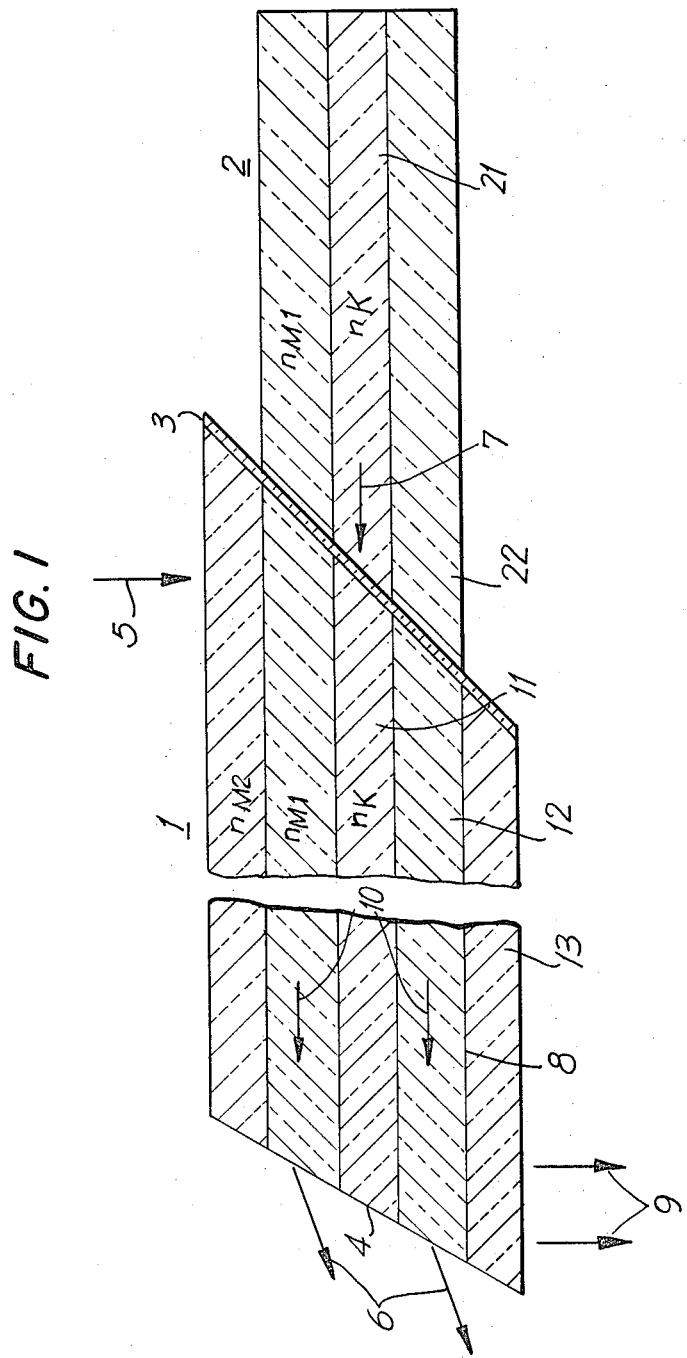
FIG. 1 illustrates an optical signal amplifying device in accordance with the present invention.

Referring now specifically to FIG. 1 of the drawing, shown extending in a longitudinal direction, two light-conductive filaments are positioned in a contiguous, coaxial relationship, of which one filament forms an intensifying or amplifying filament 1 and the other a light propagating filament 2. Intermediate the contiguous ends of the filaments there is positioned, inclined at an angle of 45° relative to the longitudinal axis of the filaments, a spectroscopic divider 3.

The amplifying-light conductive filament 1 consists of a passive material core 11 of glass and having a refractive index $n_k$, as well as a neodysium-spotted optically active material glass sleeve 12 having a refraction index $n_{m1}$; with this optically active sleeve 12 being in turn encompassed by a second glass sleeve formed of a passive material having a refractive index $n_{m2}$. The refractive indices are predetermined whereby $n_k$ is larger than $n_{m1}$, and the latter again is larger than $n_{m2}$. The distal end of the light-conductive filament 1 which is spaced from the spectroscopic divider 3 is formed with an inclined or sloped surface 4 subtending an acute angle with an axis extending normal to the longitudinal axis of the filaments.

The propagating-light conductive filament 2 includes a passive core 21 having a refractive index $n_k$, the latter of which is encompassed by a sleeve formed of a passive material 22. The last-mentioned sleeve has a refractive index of $n_{m1}$. The emissions emanating from the propagating light-conductive filament 2 by using, for example GaAlAs-laser, have a wave length of approximately 0.9 $\mu$m The signal to be amplified with a wave length of 1.06 $\mu$m (designated by arrow 5) is conveyed across the spectroscopic divider 3 directly into the active sleeve 12 or into the passive core 11, into which there is also coupled the propagated energy (designated as 7). The propagated energy extends into the active material sleeve 12 so as to generate stimulated emissions therein. These are further conveyed within the sleeve 12 as waves 10 and, in effect, through total reflection toward the contacting surface 8 intermediate the active material sleeve 12 and the passive material sleeve 13. When the signal being amplified is conveyed into the passive material core 11, this must be effected in a manner, whereby the emission impinges against the contacting surface 8 toward the active material sleeve 12 at a subtended angle which is smaller than the limiting angle of the total reflection, since this emission, in contrast with the propagated emission, is not absorbed in the active medium, since otherwise there will occur total reflection. The major portion of the amplified signal, after refraction at the surface 4, emanates from the amplifying device (shown by arrow 6), while the portion of the signal reflected at the surface 4 is emanated in the direction of arrow 9, whereby no oscillations can be generated in the light-conductive filament 1.

Figure 2:
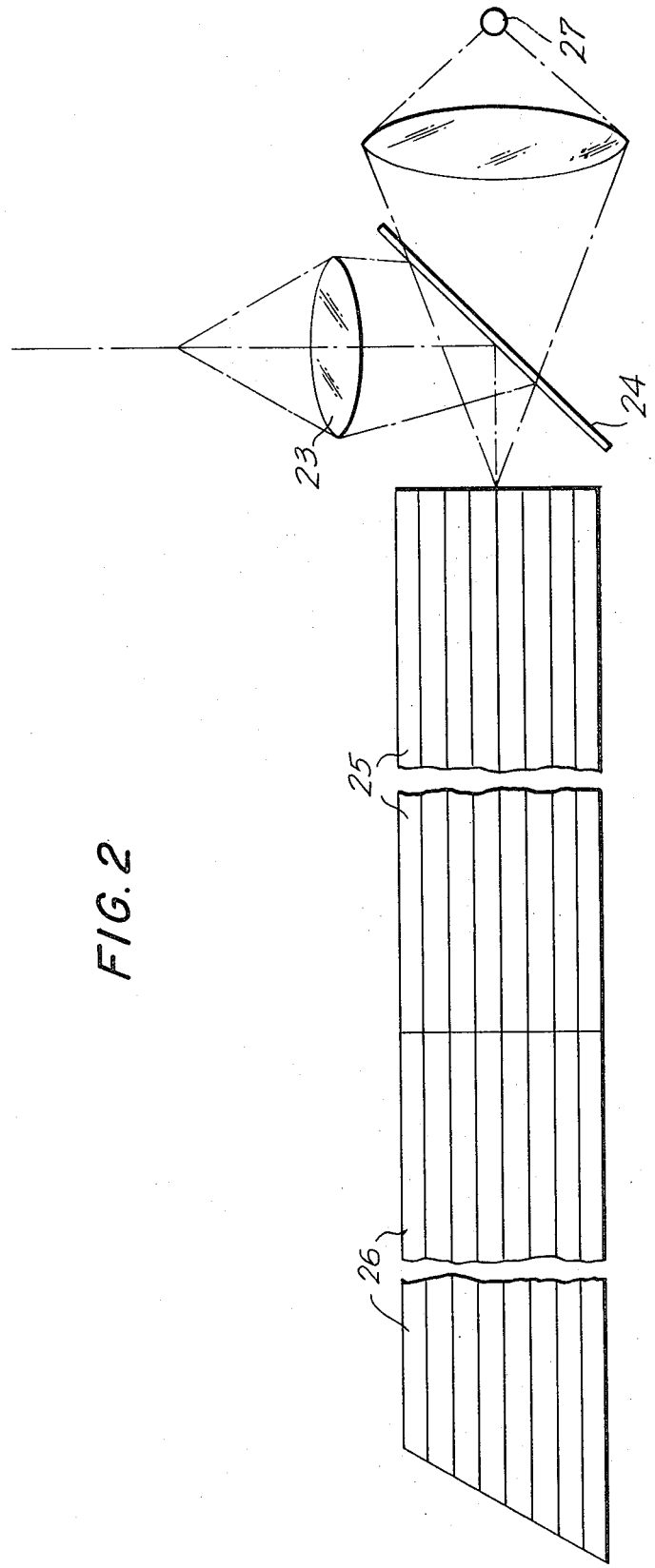
FIG. 2 illustrates an optical signal amplifying device adapted to be utilized for the amplification of one-dimensional pictures.

Referring now in particular to the embodiment of FIG. 2 of the drawings, there is disclosed a bundle of light-conductive filaments adapted to provide for the magnification or intensification of a one-dimensional picture. In order to effect the magnification, the light-conductive filament bundle is provided, for example, with an objective 23 facilitating reflection onto a spectroscopic divider 24 and toward a filament inlet or light-receiving surface, which extends in transverse section to the bundle. The filament bundle is formed of a plurality of assembled light-propagating filaments 25, each similar in structure to filament 2 in FIG. 1, which are in a contiguous and coaxially aligned relationship with an assembly or bundle of intensifying or amplifying filaments 26, each being similar to filament 1 in FIG. 1. The spectroscopic divider 24 reflects the light ray flow forming the picture, and which has, for example, a wave length of $\lambda = 1.06$, in a manner so as to have the light rays propagate through the filament bundle for magnification therein. In opposition thereto, the spectroscopic divider permits passage of the wave length utilized for the formation of rays providing the optical propagation. To this effect there may be utilized, as a light propagating source 27, a plurality of semiconductive lasers, for example, a GaAlAs-laser.

In order to effect the magnification of the picture, it is preferable that the sleeves of the filaments, as illustrated by sleeve 22 (FIG. 1), and of each individual light-conductive filament of the bundle of fibers forming the light-propagating filaments 25, proportioned whereby the cross-section of the individual light-propagating filaments 25 corresponds to that of the individual filaments of the light-intensifying filaments 26. The spectroscopic divider 24 is constructed so as to be transparent relative to the wave length of the propagating light rays, to thereby permit the latter to pass through the spectroscopic divider toward the light-receiving end of the picture-conductive filaments.

Under special circumstances, the picture-conductive filament bundle may be eliminated, so as to allow the picture and the propagated light rays to be reflected directly onto the light-receiving end of the light-intensifying filament bundle.

While there has been shown what is considered to be the preferred embodiment of the invention, it will be obvious that modifications may be made which come within the scope of the disclosure of the specification.

What I claim is:

1. A device for the amplification of a coherent optical signal with a selective fluorescent and optically active material, comprising at least one amplifying light-conductive filament said filament including a core and a first sleeve encompassing said core, said sleeve having a major portion of the refractive index thereof for optical propagated wave length smaller than the refractive index of said core, selective fluorescent material being contained in said first sleeve, said core formed of an optically passive material, and a second sleeve formed of an optically passive material encompassing said first sleeve, said second sleeve having refractive index smaller than the major portion of the refractive index of said first sleeve; a light-conductive filament formed of an optically passive material being positioned in coaxial alignment and contiguous relationship with said amplifying-light conductive filament and adapted to impart optical light propagation through said device, said propagating-light conductive filament including a core and a sleeve encompassing said core, said core and sleeve having refractive indices equal to the major portions of the refractive indices of the core and the first sleeve of said amplifying-light conductive filament; and a spectroscopic divider for effecting the conveyance of the propagated optical signal and of the signal to be amplified into said amplifying-light conductive filament.

2. A device as claimed in claim 1, said spectroscopic divider being positioned intermediate said amplifying-light conductive filament and said propagating-light conductive filament.

3. A device as claimed in claim 1, said amplifying-light conductive filament having an inclined end surface distal to the end contacting said propagating-light conductive filament, said inclined end surface subtending an acute angle with reference to an axis normal to the longitudinal axis of said filaments.

* * * * *